United States Patent
Woo et al.

(10) Patent No.: US 12,033,512 B2
(45) Date of Patent: Jul. 9, 2024

(54) SERVER FOR CONTROLLING PERSONAL MOBILITY AND METHOD OF CONTROLLING THE SAME

(71) Applicants: Hyundai Motor Company, Seoul (KR); Kia Motors Corporation, Seoul (KR)

(72) Inventors: Seunghyun Woo, Seoul (KR); Minjae Park, Gyeonggi-do (KR); Jong Bok Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 181 days.

(21) Appl. No.: 17/102,015

(22) Filed: Nov. 23, 2020

(65) Prior Publication Data

US 2021/0358307 A1   Nov. 18, 2021

(30) Foreign Application Priority Data

May 18, 2020   (KR) .......................... 10-2020-0059181

(51) Int. Cl.
  *G08G 1/00*   (2006.01)
  *H04W 4/021*   (2018.01)
(52) U.S. Cl.
  CPC ............... *G08G 1/22* (2013.01); *G08G 1/205* (2013.01); *H04W 4/021* (2013.01)

(58) Field of Classification Search
  None
  See application file for complete search history.

(56) References Cited

U.S. PATENT DOCUMENTS

| 2010/0256852 | A1* | 10/2010 | Mudalige | G08G 1/164 |
| | | | | 701/24 |
| 2014/0316865 | A1* | 10/2014 | Okamoto | G05D 1/0293 |
| | | | | 705/14.1 |
| 2019/0051188 | A1* | 2/2019 | Moustafa | G05D 1/0291 |
| 2020/0324768 | A1* | 10/2020 | Switkes | B60W 30/162 |
| 2021/0129843 | A1* | 5/2021 | George | B60W 30/165 |
| 2021/0303001 | A1* | 9/2021 | Xu | G05D 1/0022 |

FOREIGN PATENT DOCUMENTS

KR   2018-0062810 A   6/2018

\* cited by examiner

*Primary Examiner* — Richard A Goldman
*Assistant Examiner* — Charles Pall
(74) *Attorney, Agent, or Firm* — Fox Rothschild LLP

(57) ABSTRACT

A server includes a communicator and a server controller is configured to determine a personal mobility group for cluster driving based on position information and destination information of a plurality of personal mobilities received from the communicator. The server controller determines a master personal mobility among the personal mobility group, and operates the communicator to transmit a control command for determining at least one slave personal mobility following the first master personal mobility to the personal mobility group.

14 Claims, 11 Drawing Sheets

SERVER FOR CONTROLLING PERSONAL MOBILITY AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0059181, filed on May 18, 2020, the disclosure of which is incorporated by reference in its entirety.

TECHNICAL FIELD

The disclosure relates to a server that controls a personal mobility, and a method of controlling the same.

BACKGROUND

Recently, with an increase in the market for a personal mobility, which is an electricity-driven single person transportation device, the number of people using the personal mobility is gradually increasing on roads. Since the personal mobility uses a relatively narrow sidewalk or bicycle path, driving adjacent to a surrounding personal mobility is generally different from an intention of a user. According to the above-described characteristics, a cluster driving may be applied to the personal mobility, and it is necessary to provide various services using the cluster driving.

SUMMARY

An aspect of the disclosure provides a server that provides an autonomous driving centered on a master personal mobility during a cluster driving of a personal mobility, and a method of controlling the server. Additional aspects of the disclosure will be set forth in part in the description which follows and, in part, will be obvious from the description, or may be learned by practice of the disclosure.

In accordance with an aspect of the disclosure, a server may include a communicator; and a server controller configured to determine a personal mobility group for cluster driving based on position information and destination information of a plurality of personal mobilities received from the communicator, determine a master personal mobility among the personal mobility group, and operate the communicator to transmit a control command for determining at least one slave personal mobility following the first master personal mobility to the personal mobility group.

The server controller may be configured to determine a personal mobility with a longest driving distance to a destination among the personal mobility group as the first master personal mobility. The personal mobility group may have the destination in the same direction among the plurality of personal mobilities. The server controller may be configured to determine a personal mobility with a highest amount of charge among the personal mobility group as the master personal mobility. Additionally, the server controller may be configured to determine a personal mobility with the highest usage history among the personal mobility group as the master personal mobility.

In response to determining the master personal mobility, the server controller may be configured to operate the communicator to transmit a message request confirmation as to whether to approve a master status for cluster driving to the master personal mobility. In response to receiving a command for approving the master status in response to the message, the server controller may be configured to operate the communicator to provide a reward to the master personal mobility.

In response to determining the master personal mobility, the server controller may be configured to determine a plurality of slave personal mobilities following the master personal mobility, to classify a class based on the driving performance of the plurality of slave personal mobilities, and to operate the communicator to transmit the control command to the plurality of slave personal mobility for the slave personal mobility having the lowest driving performance class to drive in a middle row of the cluster driving. In response to reaching the master personal mobility within a preset radius from the destination, the server controller may be configured to operate the communicator to transmit the control command for determining a new master personal mobility from among personal mobility group excluding the master personal mobility to the personal mobility group.

In response to detecting an abnormal communication state of the master personal mobility, the server controller may be configured to operate the communicator to transmit the control command for determining a new master personal mobility from among personal mobility group excluding the master personal mobility to the personal mobility group. In response to adding a new personal mobility to the personal mobility group, the server controller may be configured to operate the communicator to transmit the control command for determining a new master personal mobility from among personal mobility group excluding the master personal mobility to the personal mobility group.

In accordance with another aspect of the disclosure, in a method of controlling a server including a communicator. The method may include determining, by a server controller, a personal mobility group for cluster driving based on position information and destination information of a plurality of personal mobilities received from the communicator; determining, by the server controller, a master personal mobility among the personal mobility group; and operating, by the server controller, the communicator to transmit a control command for determining at least one slave personal mobility following the master personal mobility to the personal mobility group.

The determining of the master personal mobility may include determining a personal mobility with a longest driving distance to a destination among the personal mobility group as the first master personal mobility. The personal mobility group may have the destination in the same direction among the plurality of personal mobilities. The determining of the master personal mobility may include determining a personal mobility with the highest amount of charge among the personal mobility group as the master personal mobility.

The determining of the master personal mobility may include determining a personal mobility with the highest usage history among the personal mobility group as the master personal mobility. In response to determining the master personal mobility, the determining of the master personal mobility may include operating the communicator to transmit a message requesting confirmation as to whether to approve a master status for cluster driving to the master personal mobility. In response to receiving a command for approving the master status in response to the message, the determining of the master personal mobility may include operating the communicator to provide a reward to the master personal mobility.

In response to determining the master personal mobility, the operating of the communicator may include determining a plurality of slave personal mobilities following the master personal mobility; classifying a class based on the driving performance of the plurality of slave personal mobilities; and operating the communicator to transmit the control command to the plurality of slave personal mobility for the slave personal mobility having the lowest driving performance class to drive in a middle row of the cluster driving. In response to reaching the master personal mobility within a preset radius from the destination, the operating of the communicator may include operating the communicator to transmit the control command for determining a new master personal mobility from among personal mobility group excluding the master personal mobility to the personal mobility group.

In response to detecting an abnormal communication state of the master personal mobility, the operating of the communicator may include operating the communicator to transmit the control command for determining a new master personal mobility from among personal mobility group excluding the master personal mobility to the personal mobility group. In response to adding a new personal mobility to the personal mobility group, the operating of the communicator may include determining the master personal mobility from among the personal mobility group to which the new personal mobility is added.

In accordance with another aspect of the disclosure, a non-transitory computer readable medium containing program instructions executed by a processor, the computer readable medium may include in combination with a computing device, determining, by a server controller, a personal mobility group for cluster driving based on position information and destination information of a plurality of personal mobilities received from the communicator; determining, by the server controller, a master personal mobility among the personal mobility group; and operating, by the server controller, the communicator to transmit a control command for determining at least one slave personal mobility following the master personal mobility to the personal mobility group.

In response to determining the master personal mobility, the transmitting of the control command to the personal mobility group may include determining a plurality of slave personal mobilities following the master personal mobility; classifying a class based on the driving performance of the plurality of slave personal mobilities; and operating the communicator to transmit the control command to the plurality of slave personal mobility for the slave personal mobility having a lowest driving performance class to drive in a middle row of the cluster driving. In response to reaching the master personal mobility within a preset radius from the destination, the operating to transmit the control command to the personal mobility group may include operating the communicator to transmit the control command for determining a new master personal mobility from among personal mobility group excluding the master personal mobility to the personal mobility group.

In response to detecting an abnormal communication state of the master personal mobility, the transmission of the control command to the personal mobility group may include operating the communicator to transmit the control command for determining a new master personal mobility from among personal mobility group excluding the master personal mobility to the personal mobility group. In response to adding a new personal mobility to the personal mobility group, the transmission of the control command to the personal mobility group may include determining the master personal mobility from among the personal mobility group to which the new personal mobility is added.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
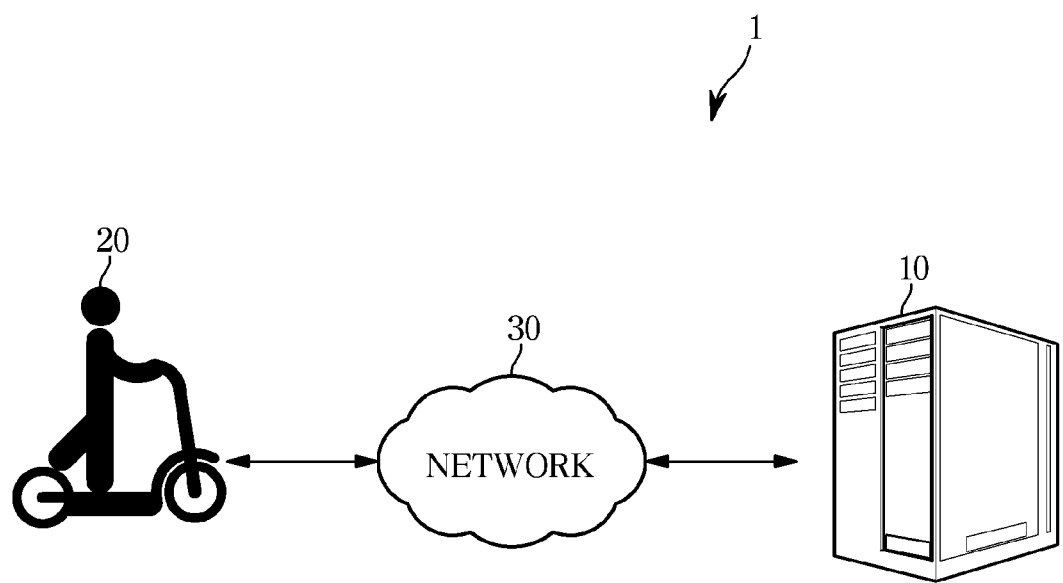
FIG. 1 is a view illustrating a configuration of a cluster driving system including a server and a personal mobility according to an exemplary embodiment of the disclosure.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network. The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise. Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings. FIG. 1 is a view illustrating a configuration of a cluster driving system including a server and a personal mobility according to an embodiment of the disclosure. Referring to FIG. 1, a cluster driving system 1 may include a server 10, a personal mobility 20 and a network 30.

The server 10 may be configured to determine a plurality of personal mobilities 20 for cluster driving among the personal mobility 20, and operate the plurality of personal mobilities 20 to cluster and drive in a cluster size corresponding to one vehicle. Accordingly, the server 10 may be configured to perform wireless communication with the personal mobility 20 via the network 30. The server 10 may be configured to communicate with the network 30 by wire or wirelessly. In particular, for wired communication and wireless communication, a known communication technique may be used.

The personal mobility 20 is an electricity-driven single person transportation device, and may include an electric wheel, an electric kickboard, an electric bicycle, and a micro electric vehicle. A type of the personal mobility 20 is not limited to the above example, and may include without limitation, as long as it is the electricity-driven single person transportation. The personal mobility 20 may be configured to perform the wireless communication with the server 10 via the network 30, and may be configured to perform cluster driving with other personal mobility 20 by receiving a control command from the server 10.

The network 30 may support communication between the server 10 and the personal mobility 20, and may be at least one of a telecommunication network, for example, a computer network (e.g., LAN or WAN), an Internet, or a telephone network. However, the type of the network 30 is not limited to the above example, and may be included without limitation if it is the network for communication support.

Figure 2:
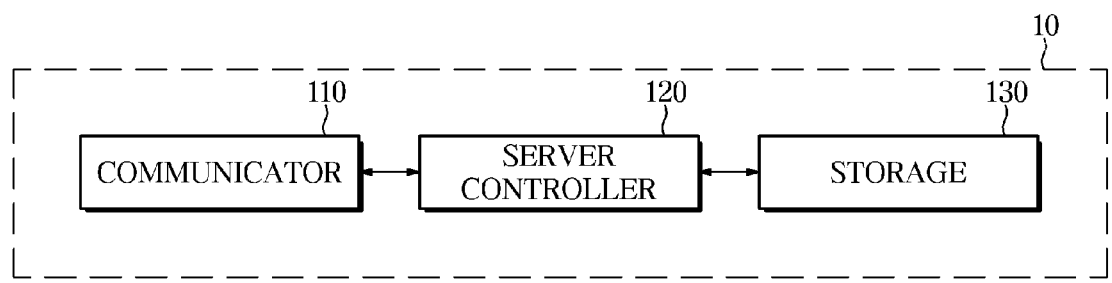
FIG. 2 is a control block diagram of a server according to an embodiment of the disclosure.

FIG. 2 is a control block diagram of a server according to an exemplary embodiment of the disclosure. Referring to FIG. 2, the server 10 may include a communicator 110 configured to communicate with the personal mobility 20 via the network 30, a server controller 120 configured to determine the plurality of personal mobilities 20 for cluster driving, and to operate the communicator 110 to transmit the control command for performing cluster driving to the plurality of personal mobilities 20, and a storage 130 configured to store various information necessary for controlling the server 10.

The communicator 110 may be connected to the network 30 by wire or wirelessly to transmit and receive data to and from the personal mobility 20. The server controller 120 may be configured to determine a personal mobility group among the plurality of personal mobilities 20 for cluster driving based on position information and destination information of each of the personal mobilities 20 received from the communicator 110. The position information may include information about a position of the personal mobility 20 that has transmitted the position information, and may correspond to, for example, a global positioning system (GPS) signal.

The destination information may include information about a destination of the personal mobility 20 that has transmitted the destination information, and may be a value input by the user of the personal mobility 20. For example, the destination information may be input by an input device provided in the personal mobility 20 or by a user terminal such as a smartphone. In other words, the server controller 120 may be configured to determine the personal mobility group for cluster driving of the personal mobilities 20 having the destination adjacent to the personal mobility 20 while being located within a preset radius based on the position information and the destination information of each of the personal mobilities 20.

In other words, the server controller 120 may be configured to determine the personal mobilities 20 with any one personal mobility 20, which is a center of the personal mobilities 20 located within the preset radius around any one personal mobility 20 that is a target for cluster driving, and the personal mobilities 20, which are adjacent to the destination as the personal mobility group to perform cluster driving together with any one of the personal mobility 20. At this time, the server controller 120 may be configured to operate the communicator 110 to transmit the message asking whether to approve cluster driving to the personal mobilities 20 located within the preset radius and adjacent to the destination, and determine only the personal mobilities 20 that have transmitted the message approving the cluster driving as the personal mobility group for cluster driving.

When the personal mobility group for cluster driving is determined, the server controller 120 may be configured to determine the master personal mobility from among the personal mobility groups. The master personal mobility may be the target of a slave personal mobility in the personal mobility group. Therefore, a slave personal mobility may follow the master personal mobility even if an independent autonomous driving function is not implemented, thereby enabling practical autonomous driving. A reference for determining the master personal mobility will be described later.

In particular, the master personal mobility may be determined as a first master personal mobility and a second master personal mobility, and may form a primary status and a secondary status. The first master personal mobility and the second master personal mobility may use at least one of a camera, a radar, a LIDAR, and a sound wave sensor to recognize a speed, a steering, the position and an arrangement of the personal mobility.

In addition, according to the exemplary embodiment, the server controller 120 may be configured to operate the communicator 110 to transmit the control command for cluster driving to the plurality of personal mobilities 20 only when the determined plurality of personal mobilities 20 is greater than or equal to a preset number. In other words, the server 10 may be configured to operate the personal mobility 20 to perform cluster driving only when the number of the personal mobilities 20 is greater than or equal to a certain number.

After determining the plurality of personal mobilities 20 for cluster driving, the server controller 120 may be configured to operate the communicator 110 to transmit the control command for driving by clustering the plurality of personal mobilities 20 in the cluster size corresponding to one vehicle to the plurality of personal mobilities 20. Particularly, the server controller 120 may be configured to operate the communicator 110 to transmit the control command for driving toward the destination at a preset speed to the plurality of personal mobilities 20.

The server controller 120 may be configured to adjust the preset speed based on the speed of the other personal mobility 20 located around the plurality of personal mobilities 20 and a congestion degree of the road on which the plurality of personal mobilities 20 are located. For example, the server controller 120 may be configured to adjust the preset speed to correspond to the speed of other personal mobility 20 located around. In particular, the server 10 may use speed information received from the other personal mobility 20, or may use speed information measured based on a detector 230 of at least one personal mobility 20 among the plurality of personal mobilities 20.

As the congestion degree of the road increases, the server controller 120 may be configured to adjust the preset speed in a direction that decreases. The server controller 120, based on sensing information received from at least one of the plurality of personal mobilities 20, may be configured to operate the communicator 110 to transmit the control command for maintaining at least one to a distance to a preceding vehicle, a distance to a left vehicle, or a distance to a right vehicle to the plurality of personal mobilities 20.

In addition, the server controller 120 may be configured to operate the communicator 110 to transmit the control command for rotation to the plurality of personal mobilities 20 in response to a turning radius of the preceding vehicle. The server controller 120 may be configured to determine the cluster size based on information about surrounding vehicles received from the plurality of personal mobilities 20. At this time, the information about surrounding vehicles may be information about vehicles located in the vicinity of the personal mobility 20 obtained from the detector 230 of the personal mobility 20, and may correspond to, for example, image data of the surrounding vehicles.

Particularly, the server controller 120 may be configured to determine a ratio between each type of surrounding vehicles located in the vicinity of the plurality of personal mobilities 20 based on the information about surrounding vehicles, and determine the cluster size with a size corresponding to the type having the highest ratio. For example, in response to determining that the ratio of commercial vehicles among the types of surrounding vehicles is determined to be a highest, the server controller 120 may be configured to determine the cluster size with the size corresponding to the commercial vehicle. In response to determining that the ratio of passenger vehicles among the types of surrounding vehicles is determined to be the highest, the server controller 120 may be configured to determine the cluster size with the size corresponding to the passenger vehicle.

In addition, the server controller 120 may be configured to determine the cluster size based on at least one of the number of personal mobilities 20 included in the plurality of personal mobilities 20, a lane width of the road on which the plurality of personal mobilities 20 are located, or the congestion degree of the road on which the plurality of personal mobilities 20 are located. The server controller 120 may be configured to determine the cluster size in proportion to the number of the personal mobilities 20 included in the group for cluster driving, and the cluster size in proportion to the lane width of the road on which the group is located, and determine the cluster size in inverse proportion to the congestion degree of the road on which the group is located.

In other words, the server controller 120 may be configured to operate the communicator 110 for the group of the plurality of personal mobilities 20 to transmit the control command for cluster driving in the cluster size occupying one lane, such as one vehicle, to each of the personal mobilities 20, and adjust the cluster size based on the number of personal mobilities 20 included in the group, the lane width of the road, or the congestion degree of the road. The server controller 120 may be configured to determine an interval for each of the plurality of personal mobilities 20 so that the group of the plurality of personal mobilities 20 corresponds to the cluster size based on at least one of the size of the personal mobility 20 included in the plurality of personal mobilities 20 or the number of personal mobilities 20 included in the plurality of personal mobilities 20.

In other words, the server controller 120 may be configured to determine the interval for each of the personal mobilities 20 in proportion to the size of the personal mobility 20 included in the group of the plurality of personal mobilities 20, and determine the interval for each of the personal mobilities 20 in inverse proportion to the number of the personal mobilities 20 included in the group of the plurality of personal mobilities 20. Accordingly, the group of the plurality of personal mobilities 20 may be more easily identified from a driver of the vehicle compared to when one personal mobility 20 is driving, to reduce the probability of an accident with the vehicle, and reduce the accident between the personal mobilities 20 according to an automatic driving.

In addition, the server controller 120 may be configured to adaptively adjust the cluster size and the interval for each personal mobility 20. For example, when at least one personal mobility 20 of the group of the plurality of personal mobilities 20 may be switched to a manual driving, the server controller 120 may be configured to exclude at least one personal mobility 20 converted to the manual driving from the group and adjust the cluster size and the interval based on the remaining personal mobility.

Even when a new personal mobility is added to the group, the server controller 120 may be configured to adjust the cluster size and the interval based on the added new personal mobility. The server controller 120 may be configured to determine to end the cluster driving when the number of the remaining personal mobility is less than or equal to the preset number. In particular, the server controller 120 may be configured to operate the communicator 110 to transmit a message about an end of the cluster driving to the remaining personal mobility.

In addition, in response to determining to end the cluster driving, the server controller 120 may be configured to operate the communicator 110 to transmit the control command for converting the remaining personal mobility to the manual driving after the preset time to the remaining personal mobility. When receiving information about the plurality of personal mobilities 20 for cluster driving and a request for cluster driving from at least one personal mobility 20 of the plurality of personal mobilities 20, the server controller 120 may be configured to operate the communicator 110 to transmit the control command for cluster driving to the plurality of personal mobilities 20. In other words, the server controller 120 may be configured to automatically determine the plurality of personal mobilities 20 for cluster driving, and may be configured to operate the plurality of personal mobilities 20 to perform the cluster driving by receiving the information about the group of the plurality of personal mobilities 20 for cluster driving and the cluster driving request from the personal mobility 20.

The server controller 120 may include at least one memory in which a program for performing the above-described operations and operations described below is stored, and at least one processor for executing the stored program. In the case of a plurality of memory and processors, it may be possible that they are integrated in one chip, and it may also be possible to be provided in a physically separate position. The storage 130 may be configured to store information for operating the server 10, for example, information about the control command for executing the cluster driving, a parameter for determining the cluster size, and correlation information between the cluster size, information for adjusting the speed of the group, and the like. The storage 130 may use a storage medium of a known type.

Figure 3:
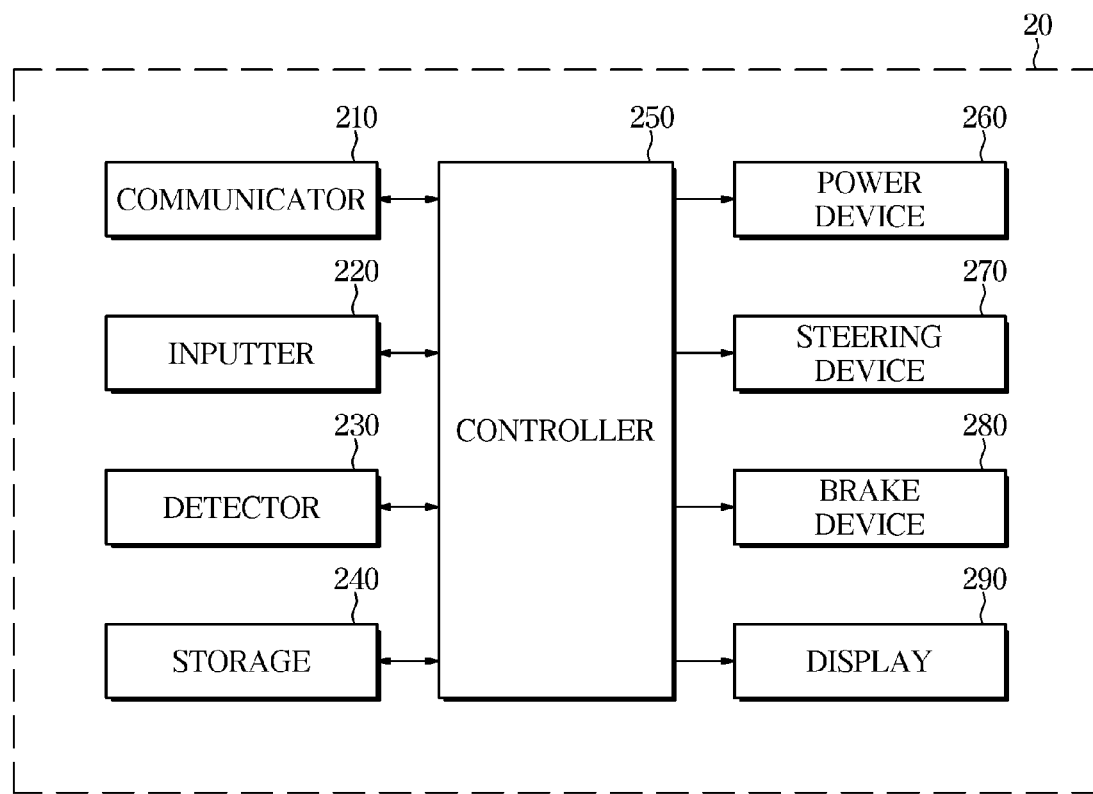
FIG. 3 is a control block diagram of a personal mobility according to an exemplary embodiment of the disclosure.

FIG. 3 is a control block diagram of a personal mobility according to an exemplary embodiment of the disclosure. Referring to FIG. 3, the personal mobility 20 may include a communicator 210 configured to communicate with the server 10 via the network 30, an inputter 220 configured to receive an input from the user, and detector 230 configured to detect the surrounding environment, a storage 240 configured to store various information necessary for the operation of the personal mobility 20, a power device 260 configured to transmit power to wheels, a steering device 270 for steering the wheels, a brake device 280 for braking the wheels, and a display 290 configured to display various types of information.

The communicator 210 may be connected to the network 30 via the wireless communication and may be configured to transmit and receive data with the server 10 or the user terminal. The inputter 220 may be configured to receive the input from the user, and may be implemented using a physical button, a knob, a touch pad, a touch screen, a stick-type manipulation device, or a trackball. However, the position and type of the inputter 220 are not limited to the above example, and there is no limitation as long as the position and type of the personal mobility 20 may receive user input.

The detector 230 may be configured to detect the surrounding environment, and may include, for example, the camera or the radar. In other words, the detector 230 may be configured to obtain image data or radar data of the surroundings, and may be configured to detect the surrounding vehicle and a surrounding personal mobility 20. The storage 240 may be configured to store various types of information necessary for the operation of the personal mobility 20, for example, information about the correlation between control commands received from the server 10 and each component, the destination information, and the position information. The storage 240 may be the type of known storage medium.

A controller 250 may be configured to operate the communicator 210 to transmit the position information such as a GPS signal and the destination information to the server 10. When receiving the message requesting confirmation as to whether to approve cluster driving from the server 10, the controller 250 may be configured to operate the display 290 to display the message. In response to receiving approval through the inputter 220, the controller 250 may be configured to operate the communicator 210 to transmit the message to approve the cluster driving to the server 10.

The controller 250 may be configured to operate at least one of the power device 260, the steering device 270, and the brake device 280 to perform the cluster driving based on the control command for cluster driving received from the server 10. The controller 250 may be configured to operate the communicator 210 to transmit the sensing information obtained using the detector 230 to the server 10. When there is a user manipulation about the power device 260, the steering device 270, or the brake device 280, the controller 250 may be configured to switch to the manual driving during the cluster driving, and may be configured to operate the communicator 210 to transmit information about switching to the manual driving to the server 10.

The controller 250 may be configured to operate the power device 260, the steering device 270, or the brake device 280 to be operated according to the control command transmitted from the server 10. When the personal mobility 20 is the slave personal mobility, the controller 250 may be configured to operate the power device 260, the steering device 270, or the brake device 280 so that the slave personal mobility follows the master personal mobility. In response to receiving the message about the end of cluster driving from the server 10, the controller 250 may be configured to operate the display 290 to display the message.

In response to receiving the control command for switching to the manual driving from the server 10, the controller 250 may be configured to terminate control of the power device 260, the steering device 270, or the brake device 280. In response to receiving the request for cluster driving and a selection for another personal mobility 20 for cluster driving through the inputter 220, the controller 250 may be configured to operate the communicator 210 to transmit the message requesting confirmation as to whether to participate in the cluster driving to another personal mobility 20, determine the personal mobility group for cluster driving based on the message indicating an intention to participate from another personal mobility 20, and operate the communicator 210 to transmit information about the personal mobility group and the request for cluster driving to the server 10.

The controller 250 may include at least one memory in which the program for performing the above-described operations and operations described below is stored, and at least one processor for executing the stored program. In the case of the plurality of memory and processors, it may be possible that they are integrated in one chip, and it may also be possible to be provided in the physically separate position. The power device 260 may be configured to transmit power to the wheels to allow the personal mobility 20 to travel. In other words, the power device 260 may be configured to transmit power to the wheels according to the operation of the controller 250 or the user's manipulation. In particular, the power device 260 may correspond to a motor driven by electricity. When the personal mobility 20 is the slave personal mobility, the power device 260 may be configured to transmit power to the wheels so that the speed of the slave personal mobility is equal to the speed of the master personal mobility under the operation of the controller 250.

The steering device 270 may be configured to adjust a driving direction of the personal mobility 20 by steering the wheels. In other words, the steering device 270 may steer the wheels according to the operation of the controller 250 or the user's manipulation. When the personal mobility 20 is the slave personal mobility, the steering device 270 may be configured to adjust the driving direction so that the driving direction of the slave personal mobility coincides with the driving direction of the master personal mobility under the operation of the controller 250.

The brake device 280 may be configured to brake the personal mobility 20 by braking the wheels. In other words, the brake device 280 may provide a braking force to the wheels according to the operation of the controller 250 or the user's manipulation, and a known type of brake device may be used. When the personal mobility 20 is the slave personal mobility, the brake device 280 may provide the braking force to the wheels of the slave personal mobility when the master personal mobility decreases or stops under the operation of the controller 250.

The display 290 may be configured to display various types of messages under operation of the controller 250 and may correspond to a known type of display device. The position and type of the display 290 is not limited as long as it is a position and type capable of displaying the message to the user of the personal mobility 20. In the above, each configuration of the server 10 and the personal mobility 20 has been described. Hereinafter, the personal mobility 20 will be described in detail about cluster driving.

Figure 4:
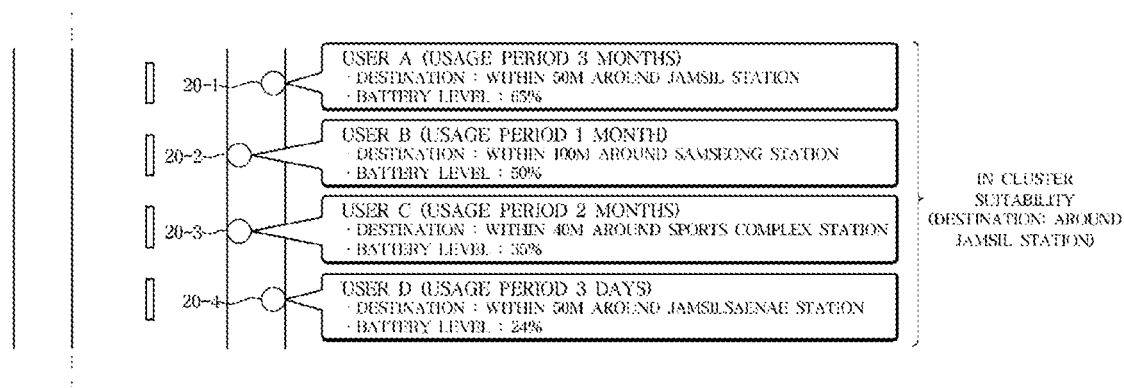
FIG. 4 is a view illustrating a case where a server determines a plurality of personal mobilities for cluster driving according to an exemplary embodiment of the disclosure.
Figure 5:
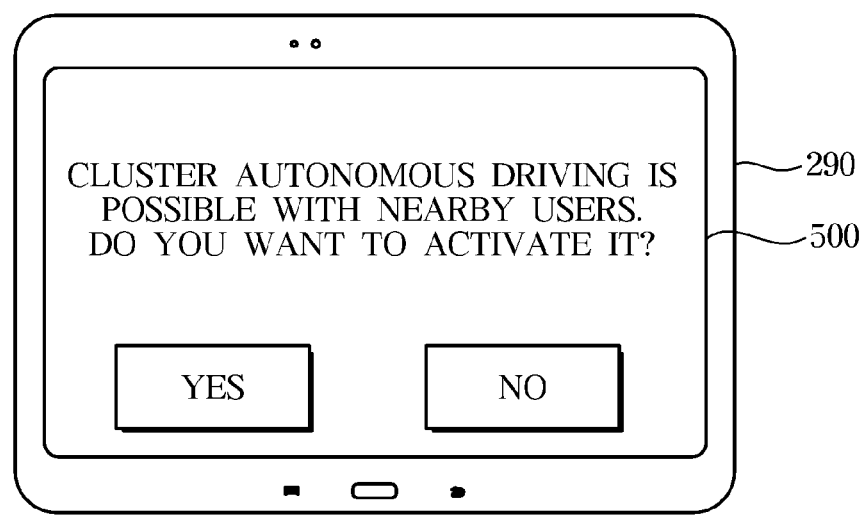
FIG. 5 is a view for describing a case in which a server transmits a message asking whether to approve cluster driving according to an embodiment of the disclosure.
Figure 6:
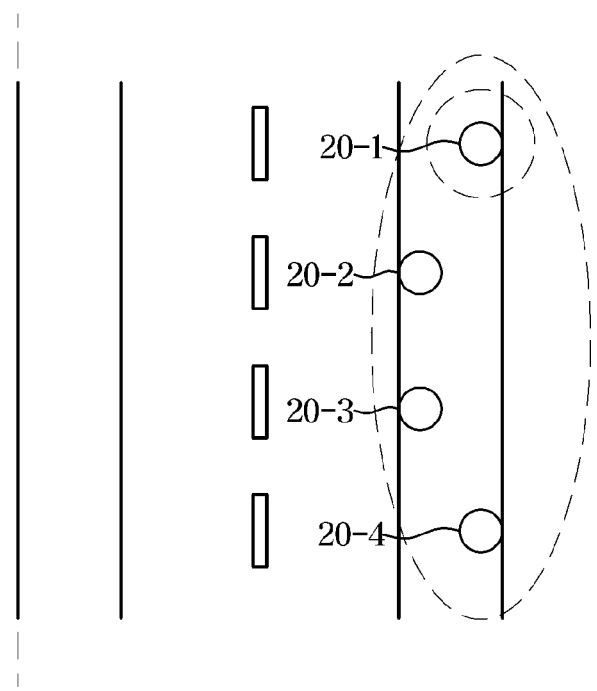
FIG. 6 is a view for describing a master personal mobility determined by a server according to an exemplary embodiment of the disclosure.

FIG. 4 is a view illustrating a case where a server determines a plurality of personal mobilities for cluster driving according to an exemplary embodiment of the disclosure, FIG. 5 is a view for describing a case in which a server transmits a message requesting confirmation as to whether to approve cluster driving according to an exemplary embodiment of the disclosure, and FIG. 6 is a view for describing a master personal mobility determined by a server according to an exemplary embodiment of the disclosure. Referring to FIG. 4, the server 10 may be configured to determine the personal mobility group for cluster driving based on the position information and the destination information of each of the personal mobility 20 received from the communicator 110.

The position information may include information about the position of the personal mobility 20 that has transmitted the position information, and may correspond to, for example, the GPS signal. The destination information may include information about the destination of the personal mobility 20 that has transmitted the destination information, and may be the value input by the user of the personal mobility 20. For example, the destination information may be input by the input device provided in the personal mobility 20 or by the user terminal such as the smartphone.

In other words, the server controller 120 may be configured to determine the personal mobility group for cluster driving of the personal mobilities 20 having the destination adjacent to the personal mobility 20 while being located within the preset radius based on the position information and the destination information of each of the personal mobilities 20. In other words, as illustrated in FIG. 4, the server controller 120 may be configured to determine the personal mobilities 20-2 to 20-4 with any one personal mobility 20-1, which is the center of the personal mobilities 20-2 to 20-4 located within the preset radius around any one personal mobility 20-1 that is the target for cluster driving, and the personal mobilities 20-2 to 20-4, which are adjacent to the destination as the personal mobility group to perform cluster driving together with any one of the personal mobility 20-1.

At this time, the server controller 120 may be configured to operate the communicator 110 to transmit the message asking whether to approve cluster driving to the personal mobilities 20-1 to 20-4 located within the preset radius and adjacent to the destination, and determine only the personal mobilities 20 that have transmitted the message approving the cluster driving as the personal mobility group for cluster driving. In other words, the personal mobility 20 receiving the message may be configured to display a message 500 requesting confirmation as to whether to approve cluster driving through the display 290, as illustrated in FIG. 5, and may be configured to operate the communicator 210 to transmit the message to approve cluster driving to the server 10 based on the user input received from the inputter 220. However, the display of the message 500 and the input of approval for the message 500 may be performed using the user terminal such as the smartphone interlocked with the personal mobility 20.

For example, when the personal mobilities 20-1 to 20-4 transmit the message to approve cluster driving to the server 10, as illustrated in FIG. 6, the server 10 may be configured to determine and group the personal mobilities 20-1 to 20-4 as the plurality of personal mobilities 20-1 to 20-4 for cluster driving, and transmit the control command for cluster driving to the destination. The server controller 120 may be configured to determine and group the personal mobility groups 20-1 to 20-4 for cluster driving, then determine any one personal mobility among the personal mobility groups as the master personal mobility, and operate the communicator 110 to transmit the control command for determining the remaining personal mobility as the slave personal mobility following the master personal mobility.

In particular, the cluster driving may refer to driving in which the slave personal mobility included in the personal mobility group drives to the destination by autonomous driving without the user manipulation, and the controller 250 of each personal mobility 20 may be configured to operate at least one of the power device 260, the steering device 270, and the brake device 280 to perform cluster driving based on the control command received from the server 10. At this time, the master personal mobility drives to the destination by the user's manipulation, and the remaining slave personal mobility follows the master personal mobility.

Particularly, when the master personal mobility drives toward the destination at the preset speed (e.g., about 15 km/h), the server controller 120 may be configured to operate the communicator 110 so that the slave personal mobilities also transmit the control command for driving the preset speed (e.g., about 15 km/h) to the slave personal mobilities 20-2 to 20-4. For example, the server controller 120 may be configured to adjust the preset speed to correspond to the speed of other personal mobility 20 located around. Particularly, the server controller 120 may be configured to adjust the preset speed of the slave personal mobility so that the speed of the slave personal mobility is the same as the speed of the master mobility. The server 10 may use the speed information received from the other personal mobility 20, or may use the speed information measured based on the detector 230 of at least one personal mobility 20 among the plurality of personal mobilities 20.

As the congestion degree of the road increases, the server controller 120 may be configured to adjust the preset speed in the direction that decreases. The master personal mobility may be determined according to various reference. At this time, various reference may be set based on the stability and efficiency of cluster driving. The server controller 120 may be configured to determine the personal mobilities whose destination is the same direction among the plurality of personal mobilities as the mobility group. In particular, the server controller 120 may be configured to determine the personal mobility having a longest driving distance to the destination among the personal mobility groups as the master personal mobility.

The server controller 120 may be configured to determine the personal mobility with the highest charging amount among the personal mobility groups as the master personal mobility. According to the disclosure, it may be possible to prevent forcibly canceling cluster driving due to discharge of the master personal mobility. The server controller 120 may be configured to determine the personal mobility having the highest usage history among the personal mobility groups as the master personal mobility.

Figure 7:
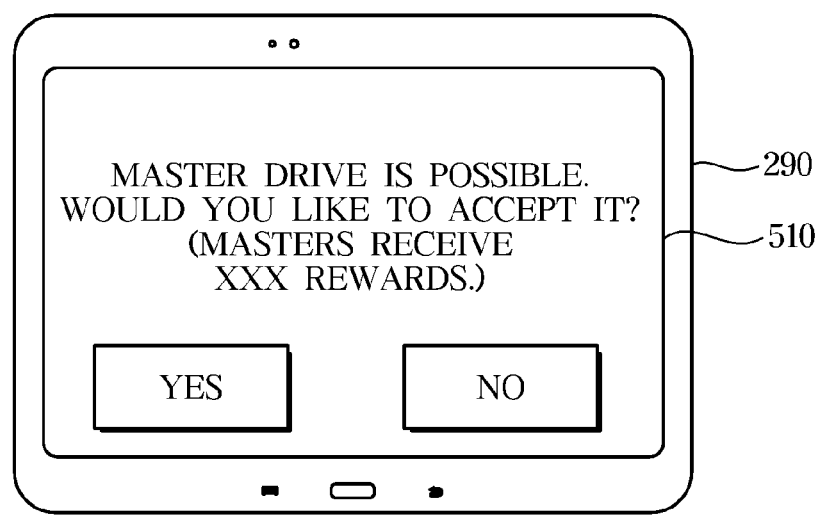
FIG. 7 is a view for describing a message asking whether a server approves a master status for cluster driving to a master personal mobility according to an exemplary embodiment of the disclosure.

Meanwhile, the master personal mobility may be automatically determined by the server controller 120 and may be finally determined by the server controller 120 and the user's approval. As illustrated in FIG. 7, in response to receiving a message 510 requesting confirmation as to whether to approve the master status from the server 10, the controller 250 may be configured to operate the display 290 to display the message. In response to receiving approval is received from the inputter 220, the controller 250 may be configured to operate the communicator 210 to transmit the message for approving the master status to the server 10. At this time, the server 10 may provide a reward on condition that the user approves the master status. For example, the reward may be achieved in various ways, such as discounts on personal mobility service charges.

Figure 8:
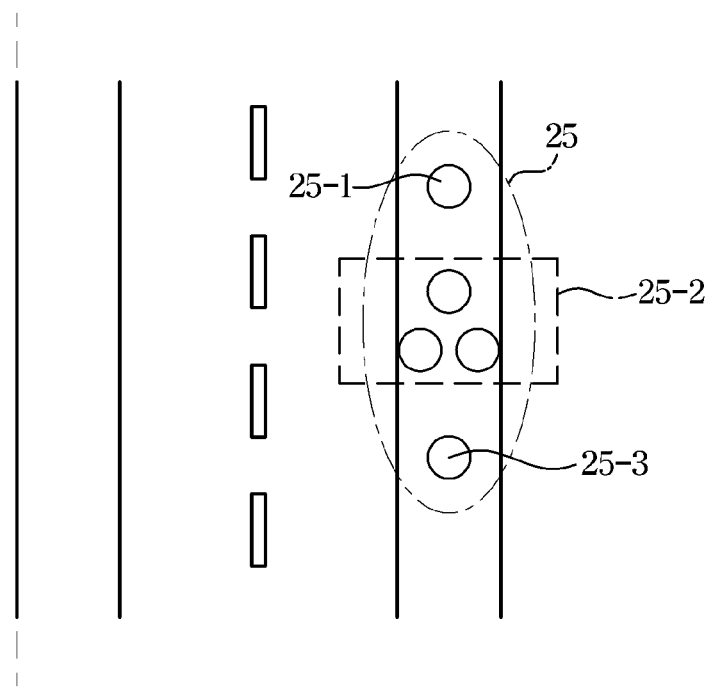
FIG. 8 is a view for describing that a server determines a row for cluster driving according to an exemplary embodiment of the disclosure.

FIG. 8 is a view for describing that a server determines a row for cluster driving according to an exemplary embodiment of the disclosure. When the master personal mobility is determined within the personal mobility group, the server controller 120 may be configured to determine a plurality of slave personal mobilities following the master personal mobility. The plurality of slave personal mobilities may be separated by the preset distance based on the master personal mobility to perform the cluster driving. In particular, the plurality of slave personal mobilities may follow the master personal mobility according to a certain arrangement.

For example, the plurality of slave personal mobilities may form the arrangement of cluster driving based on each driving performance. Particularly, the arrangement of cluster driving may be formed in an order of high driving performance and close to the master personal mobility. Thus, congestion in cluster driving may be prevented. As another example, as illustrated in FIG. 8, in the plurality of slave personal mobilities, a slave personal mobility 25-2 having the lowest driving performance level may drive in a middle row of the cluster driving. In particular, the server controller 120 may be configured to operate the communicator 110 to transmit the control command that causes the speed of the master personal mobility to be the same as the slave personal mobility 25-2 having the lowest driving performance level.

Figure 9:
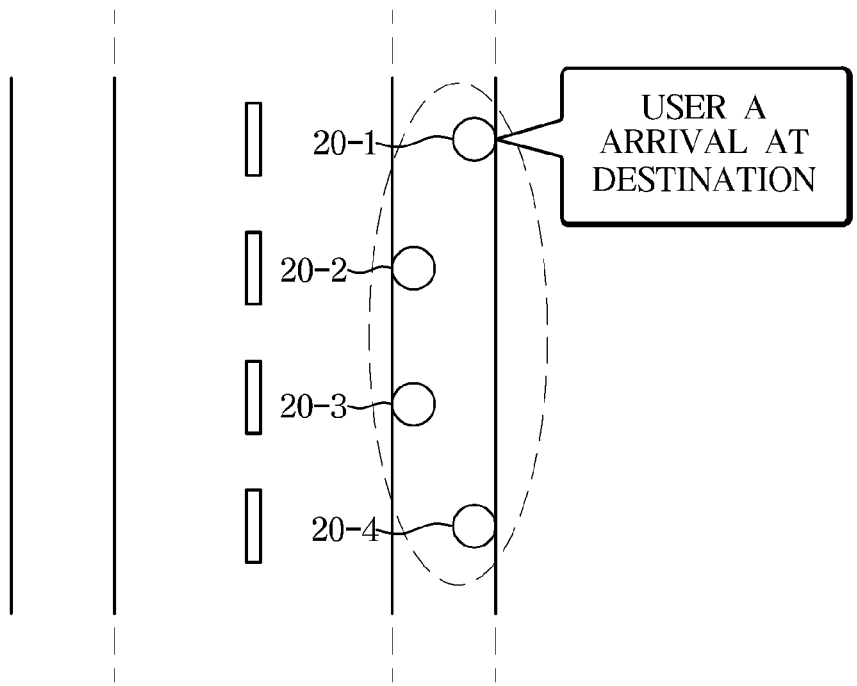
FIGS. 9 and 10 are views for describing that a server changes a status of a master personal mobility according to an exemplary embodiment of the disclosure.
Figure 10:
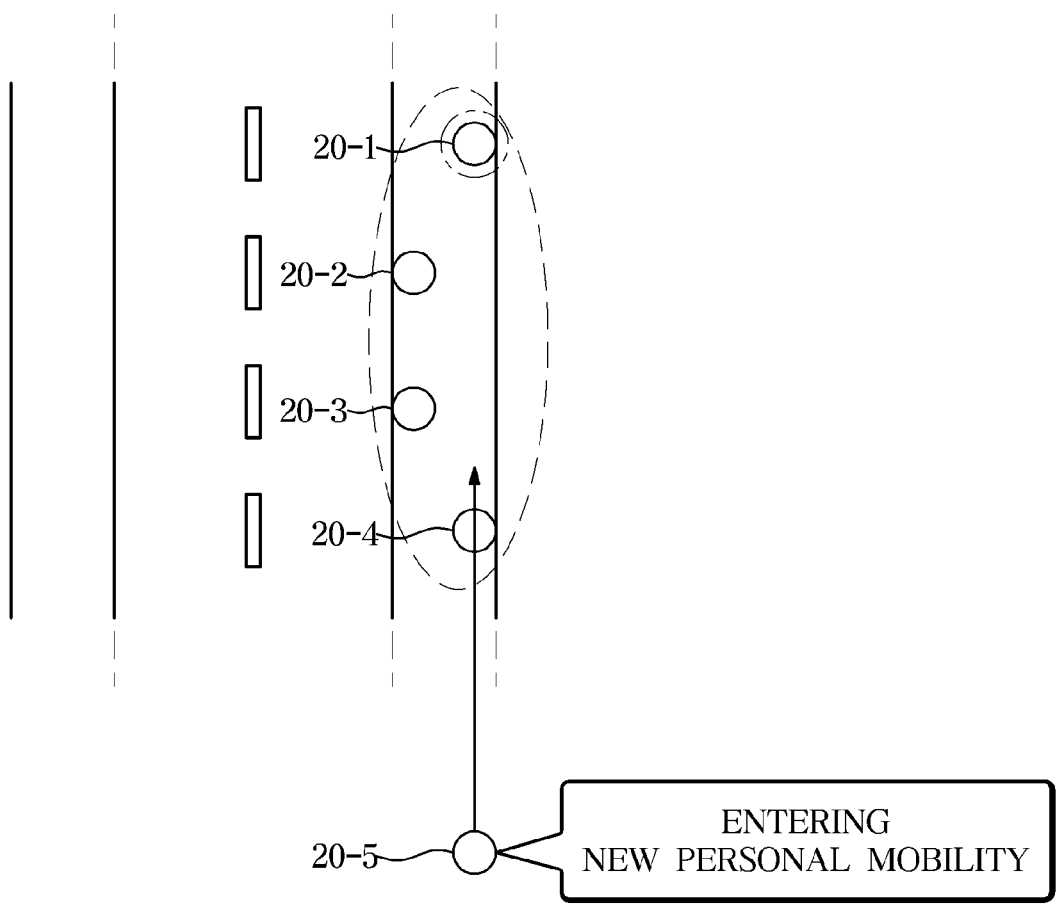

Meanwhile, in the personal mobility group, the cluster driving may be terminated when the status of the master personal mobility disappears. Therefore, it is necessary to determine a new master personal mobility in consideration of the case in which the status of the master personal mobility in cluster driving disappears. FIGS. 9 and 10 are views for describing that a server changes a status of a master personal mobility according to an exemplary embodiment of the disclosure. FIG. 9 illustrates a case where the master personal mobility reaches the destination. Accordingly, the user of the master personal mobility is expected to end driving soon, and the cluster driving may end when the master status is released.

When the master personal mobility reaches the destination, reaches within the preset radius from the destination, or selects the end of cluster driving, the server controller 120 may be configured to operate the communicator 110 to transmit the control command for determining the new master personal mobility group among the personal mobility groups excluding the master personal mobility to the personal mobility group. At this time, the server controller 120 may be configured to operate the communicator 110 to transmit the control command for determining that the slave mobility with the longest driving distance to the destination, the highest charging amount, or the highest usage history among the existing slave personal mobilities as the new master personal mobility.

In addition, according to the exemplary embodiment, in response to detecting an abnormal communication state of the master personal mobility in cluster driving, the server controller 120 may be configured to operate the communicator 110 to transmit the control command for determining the master personal mobility among the personal mobility groups excluding the master personal mobility to the personal mobility groups.

FIG. 10 illustrates a case where the new personal mobility newly participates in the personal mobility group in cluster driving. According to the exemplary embodiment, when the new personal mobility is added to the personal mobility group in cluster driving, the server controller 120 may be configured to determine the master personal mobility from among the personal mobility groups to which the new personal mobility is added. For example, as illustrated in FIG. 10, when the new personal mobility participates in the personal mobility group in cluster driving, the server controller 120 may be configured to compare the current master personal mobility and the new personal mobility, and maintain or change the personal mobility with the longest driving distance to the destination, the highest charging amount, or the highest usage history as the master personal mobility.

Figure 11:
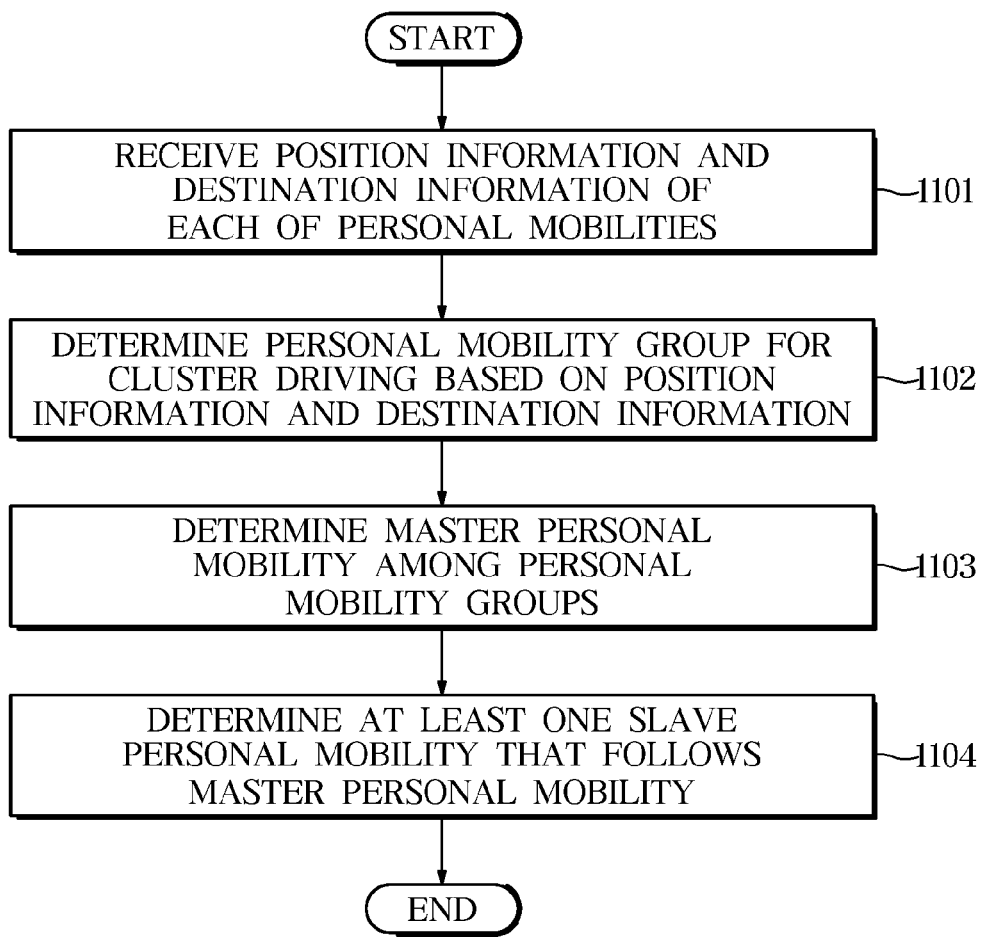
FIG. 11 is a flowchart illustrating a method of controlling a server according to an exemplary embodiment of the disclosure.

FIG. 11 is a flowchart illustrating a method of controlling a server according to an exemplary embodiment of the disclosure. A description with reference to FIG. 11 has been described with the server 10 as an operating entity, but is not limited to the server 10. The server 10 may be configured to receive the position information and the destination information of each of the personal mobilities (1101). The position information may include the information about the position of the personal mobility 20 that has transmitted the position information, and may correspond to, for example, the GPS signal. In addition, the destination information may include the information about the destination of the personal mobility 20 that has transmitted the destination information, and may be the value input by the user of the personal mobility 20. For example, the destination information may be input by the input device provided in the personal mobility 20 or by the user terminal such as the smartphone.

The server 10 may be configured to determine the personal mobility group for cluster driving based on the position information and the destination information (1102). The server 10 may be configured to determine the personal mobilities 20 with any one personal mobility 20, which is a center of the personal mobilities 20 located within the preset radius around any one personal mobility 20 that is a target for cluster driving, and the personal mobilities 20, which are adjacent to the destination as the personal mobility group to perform cluster driving together with any one of the personal mobility 20. In particular, the personal mobility group performing cluster driving may include those with the same driving direction in addition to those with adjacent the destination.

The server 10 may be configured to determine the master personal mobility from among the personal mobility groups (1103). In particular, the reference for determining the master personal mobility are as described above. The server 10 may be configured to determine at least one slave personal mobility that follows the master personal mobility (1104). In particular, the at least one slave personal mobility may correspond to the personal mobility excluding the master personal mobility from among the personal mobility groups.

According to the exemplary embodiments of the disclosure, even if the personal mobility itself does not provide the autonomous driving function, it may be possible to perform the autonomous driving via the server.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed exemplary embodiments. The recording medium may be implemented non-transitory as a computer-readable recording medium. The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, and the like.

Exemplary embodiments of the disclosure have thus far been described with reference to the accompanying drawings. It should be apparent to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A server, comprising:
    a communicator configured to communicate with a plurality of personal mobilities; and
    a server controller configured to:
        receive position information and destination information from the plurality of personal mobilities,
        determine a personal mobility group for cluster driving based on the position information and the destination information of the plurality of personal mobilities,
        determine a master personal mobility including at least one of a first master personal mobility and a second master personal mobility among the personal mobility group,
        determine a remaining personal mobility among the personal mobility group as a slave personal mobility configured to follow the first master personal mobility, and
        transmit a control command for cluster driving to the first master personal mobility, the second master personal mobility, and the slave personal mobility,
    wherein upon transmitting the control command, the server controller is configured to control at least one of speed, steering, position, or arrangement of the slave personal mobility so that the slave personal mobility follows the first master personal mobility,
    wherein the server controller is configured to determine a personal mobility with a highest usage history and a highest charging amount among the personal mobility group as the first master personal mobility,
    wherein the personal mobility group has a destination in a same direction among the plurality of personal mobilities,
    wherein the second master personal mobility is configured to follow the first master personal mobility, and
    wherein the server controller is configured to:
        in response to determining the master personal mobility, determine a plurality of slave personal mobilities following the master personal mobility;
        classify a class based on the driving performance of the plurality of slave personal mobilities; and
        operate the communicator to transmit the control command to the plurality of slave personal mobilities to drive the slave personal mobility having the lowest driving performance class in a middle row of the cluster driving.

2. The server according to claim 1, wherein:
    the server controller is configured to determine a personal mobility with a longest driving distance to the destination among the personal mobility group as the first master personal mobility.

3. The server according to claim 1, wherein the server controller is configured to operate the communicator to cause the first master personal mobility to control at least one of speed, steering, position, and arrangement of the slave personal mobility based on a forward situation.

4. The server according to claim 1, wherein the server controller is configured to determine the master personal mobility based on at least one of a driver output, a maximum speed, a minimum speed and an amount of charge of the plurality of personal mobilities.

5. The server according to claim 1, wherein the server controller is configured to determine the master personal mobility based on at least one of a driving distance, and a driving wheel size of the plurality of personal mobilities.

6. The server according to claim 1, wherein:
    the server controller is configured to periodically identify a state of the first master personal mobility and a state of the second master personal mobility, and re-determine the first master personal mobility based on the identified result; and
    the re-determination is not performed in response to determining that the slave personal mobility is in a curved driving or an abnormal communication state.

7. The server according to claim 1, wherein, in response to reaching the master personal mobility within a preset radius from the destination, detecting an abnormal communication state of the master personal mobility, or adding a new personal mobility to the personal mobility group, the server controller is configured to operate the communicator to transmit the control command for determining a new master personal mobility from among personal mobility group excluding the master personal mobility to the personal mobility group.

8. A method of controlling a server including a communicator, comprising:
receiving, by a server controller, position information and destination information from a plurality of personal mobilities;
determining, by the server controller, a personal mobility group for cluster driving based on position information and destination information of the plurality of personal mobilities;
determining, by the server controller, a master personal mobility including at least one of a first master personal mobility and a second master personal mobility among the personal mobility group;
determining, by the server controller, a remaining personal mobility among the personal mobility group as a slave personal mobility configured to follow the first master personal mobility; and
transmitting, by the server controller, a control command for cluster driving to the first master personal mobility, the second master personal mobility, and the slave personal mobility,
wherein upon transmitting the control command, the server controller is configured to control at least one of speed, steering, position, or arrangement of the slave personal mobility so that the slave personal mobility follows the first master personal mobility,
wherein determining the master personal mobility includes determining a personal mobility with a highest usage history and a highest charging amount among the personal mobility group as the first master personal mobility,
wherein the personal mobility group has a destination in a same direction among the plurality of personal mobilities,
wherein the second master personal mobility is configured to follow the first master personal mobility, and
wherein operating the communicator includes:
in response to determining the master personal mobility, determining a plurality of slave personal mobilities following the master personal mobility;
classifying a class based on the driving performance of the plurality of slave personal mobilities; and
operating the communicator to transmit the control command to the plurality of slave personal mobilities to drive the slave personal mobility having the lowest driving performance class in a middle row of the cluster driving.

9. The method according to claim 8, wherein:
determining the master personal mobility includes determining the personal mobility with a longest driving distance to the destination among the personal mobility group as the first master personal mobility.

10. The method according to claim 8, wherein the determining of the master personal mobility includes:
operating the communicator to cause the first master personal mobility to control at least one of speed, steering, position, and arrangement of the slave personal mobility based on a forward situation.

11. The method according to claim 8, wherein the determining of the master personal mobility includes:
determining the master personal mobility based on at least one of a driver output, a maximum speed, a minimum speed and an amount of charge of personal mobilities.

12. The method according to claim 8, wherein the operating of the communicator includes:
determining the master personal mobility based on at least one of a driving distance, and a size of driving wheels of the plurality of personal mobilities.

13. The method according to claim 8, wherein the operating of the communicator includes:
periodically identifying a state of the first master personal mobility and a state of the second master personal mobility; and
re-determining the first master personal mobility based on the identified result, and
wherein the re-determination is not performed in response to determining that the slave personal mobility is in a curved driving or an abnormal communication state.

14. The method according to claim 8, wherein the operating of the communicator includes:
in response to reaching the master personal mobility within a preset radius from the destination, detecting an abnormal communication state of the master personal mobility, or adding a new personal mobility to the personal mobility group, operating the communicator to transmit the control command for determining a new master personal mobility from among personal mobility group excluding the master personal mobility to the personal mobility group.

* * * * *